United States Patent
de los Santos

(10) Patent No.: US 6,897,537 B2
(45) Date of Patent: May 24, 2005

(54) MICRO-ELECTRO-MECHANICAL SYSTEM (MEMS) VARIABLE CAPACITOR APPARATUSES AND RELATED METHODS

(75) Inventor: Hector J. de los Santos, Irvine, CA (US)

(73) Assignee: Wispry, Inc., Irvine, CA (US)

( * ) Notice: Subject to any disclaimer, the term of this patent is extended or adjusted under 35 U.S.C. 154(b) by 0 days.

(21) Appl. No.: 10/461,021

(22) Filed: Jun. 13, 2003

(65) Prior Publication Data

US 2004/0036132 A1 Feb. 26, 2004

Related U.S. Application Data

(60) Provisional application No. 60/388,490, filed on Jun. 13, 2002.

(51) Int. Cl.⁷ .................... H01L 27/108; H01L 29/76
(52) U.S. Cl. .................... 257/414; 257/312; 257/595; 361/277; 361/278; 361/290; 361/292; 361/299.1
(58) Field of Search ................ 257/312, 595; 361/277, 278, 290, 292, 299.1

(56) References Cited

U.S. PATENT DOCUMENTS

| | | | |
|---|---|---|---|
| 6,229,684 B1 | 5/2001 | Cowen et al. | |
| 6,377,438 B1 | 4/2002 | Deane et al. | |
| 6,701,779 B2 | * 3/2004 | Volant et al. | .......... 73/105 |
| 2002/0131228 A1 | * 9/2002 | Potter | .......... 361/233 |

* cited by examiner

Primary Examiner—Allan R. Wilson
Assistant Examiner—Joseph Nguyen
(74) Attorney, Agent, or Firm—Jenkins, Wilson & Taylor P.A.

(57) ABSTRACT

Micro-Electro-Mechanical System (MEMS) Variable Capacitor Apparatus and Related Methods. According to one embodiment, a MEMS variable capacitor is provided. The variable capacitor can include first and second electrodes being spaced apart, and at least one of the electrodes being movable when a voltage is applied across the first and second electrodes. The variable capacitor can also include a first conductive plate attached to and electrically isolated from the first electrode. Furthermore, the variable capacitor can include a second conductive plate attached to the second electrode and spaced from the first conductive plate for movement of at least one of the plates with respect to the other plate upon application of voltage across the first and second electrodes to change the capacitance between the first and second plates.

32 Claims, 8 Drawing Sheets

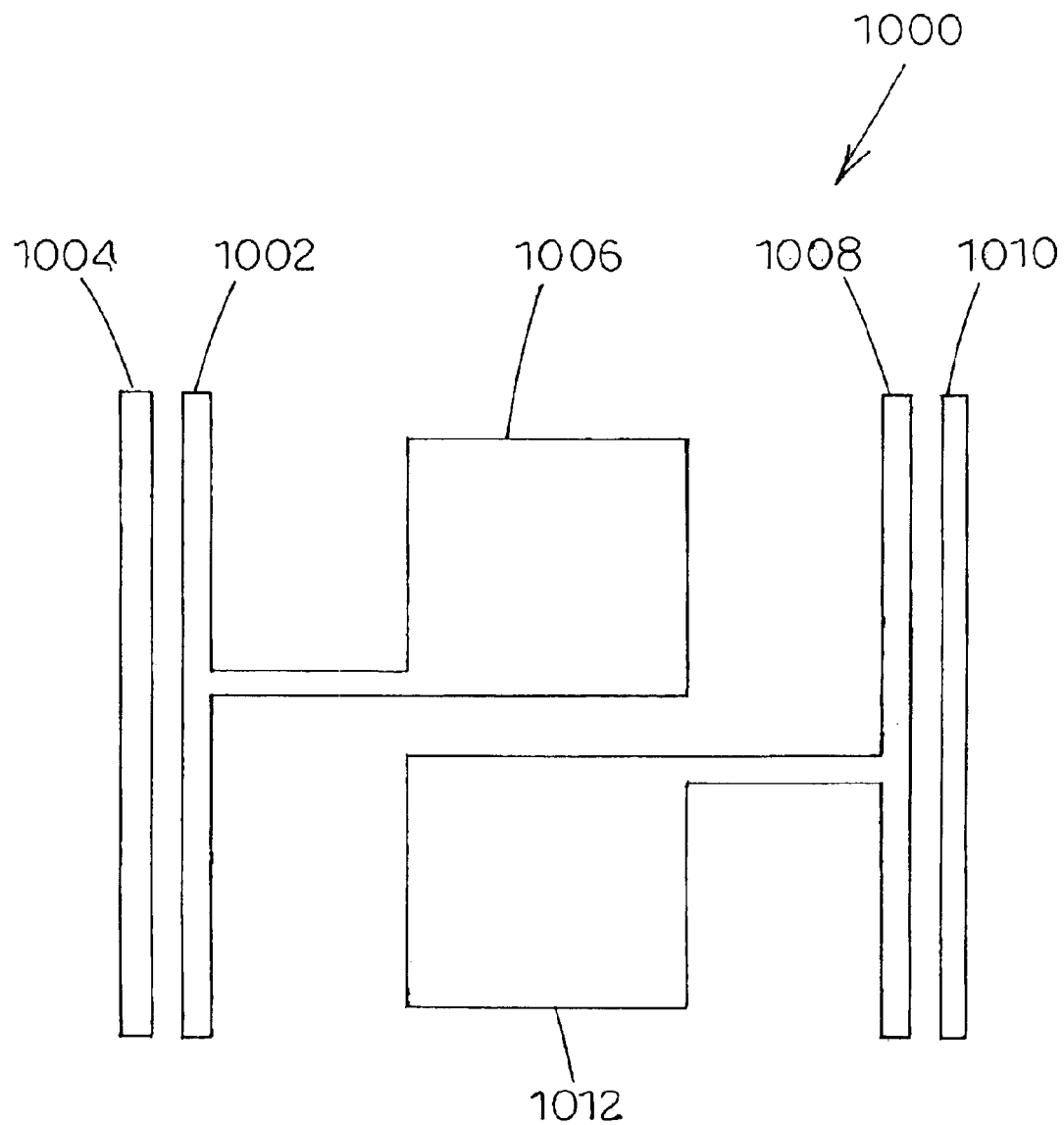

MICRO-ELECTRO-MECHANICAL SYSTEM (MEMS) VARIABLE CAPACITOR APPARATUSES AND RELATED METHODS

CROSS-REFERENCE TO RELATED APPLICATION

This nonprovisional application claims the benefit of U.S. Provisional Application No. 60/388,490, filed Jun. 13, 2002, the disclosure of which is incorporated by reference herein in its entirety.

TECHNICAL FIELD

The present subject matter relates generally to micro-electro-mechanical systems (MEMS) apparatuses and methods. More particularly, the present subject matter relates to variable capacitor apparatuses and related methods utilizing MEMS technology.

BACKGROUND ART

Micro-electro-mechanical systems (MEMS) apparatuses and methods are presently being developed for a wide variety of applications in view of the size, cost and power consumption advantages provided by these devices. Specifically, a variable capacitor, also known as a varactor, can be fabricated utilizing MEMS technology. Typically, a variable capacitor includes an interelectrode spacing between a pair of electrodes that can be controllably varied in order to selectively vary the capacitance between the electrodes. In this regard, conventional MEMS variable capacitors include a pair of electrodes, one of which is typically disposed upon and fixed to the substrate and the other of which is typically carried on a movable actuator or driver. In accordance with MEMS technology, the movable actuator is typically formed by micromachining the substrate such that very small and very precisely defined actuators can be constructed.

As appreciated by persons skilled in the art, many types of MEMS variable capacitors and related devices can be fabricated by either bulk or surface micromachining techniques. Bulk micromachining generally involves sculpting one or more sides of a substrate to form desired three dimensional structures and devices in the same substrate material. The substrate is composed of a material that is readily available in bulk form, and thus ordinarily is silicon or glass. Wet and/or dry etching techniques are employed in association with etch masks and etch stops to form the microstructures. Etching is typically performed through the backside of the substrate. The etching technique can generally be either isotropic or anisotropic in nature. Isotropic etching is insensitive to the crystal orientation of the planes of the material being etched (e.g., the etching of silicon by using a nitric acid as the etchant). Anisotropic etchants, such as potassium hydroxide (KOH), tetramethyl ammonium hydroxide (TMAH), and ethylenediamine pyrochatechol (EDP), selectively attack different crystallographic orientations at different rates, and thus can be used to define relatively accurate sidewalls in the etch pits being created. Etch masks and etch stops are used to prevent predetermined regions of the substrate from being etched.

On the other hand, surface micromachining generally involves forming three-dimensional structures by depositing a number of different thin films on the top of a silicon wafer, but without sculpting the wafer itself. The films usually serve as either structural or sacrificial layers. Structural layers are frequently composed of polysilicon, silicon nitride, silicon dioxide, silicon carbide, or aluminum. Sacrificial layers are frequently composed of polysilicon, photoresist material, polimide, metals, or various types of oxides, such as PSG (phosphosilicate glass) and LTO (low-temperautre oxide). Successive deposition, etching, and patterning procedures are carried out to arrive at the desired microstructure. In a typical surface micromachining process, a silicon substrate is coated with an isolation layer, and a sacrificial layer is deposited on the coated substrate. Windows are opened in the sacrificial layer, and a structural layer is then deposited and etched. The sacrificial layer is then selectively etched to form a free-standing, movable microstructure such as a beam or a cantilever out of the structural layer. The microstructure is ordinarily anchored to the silicon substrate, and can be designed to be movable in response to an input from an appropriate actuating mechanism.

MEMS variable capacitors have been fabricated that include a movable, conductive plate that is suspended above first and second coplanar electrodes. The variable capacitor operates by applying a voltage across the first electrode and the movable plate so that the plate is deflected towards the first electrode by electrostatic attraction. As the movable plate moves, the spacing between the second electrode and the movable plate changes, thus changing the capacitance value between the second electrode and the plate. A signal line is usually connected to the second electrode and the plate to sense the change in capacitance for use in various Radio Frequency functions. One problem with this configuration is that the voltage supply is electrically connected to the signal line through the plate that can result in undesirable noise/interference or degradation of the signal on the signal line. Thus, this configuration may require additional components to combine/separate the signal and actuation voltage, leading to a more complex and costly implementation.

Other known MEMS variable capacitors provide parallel-plate electrodes that move linearly. The electrodes of these variable capacitors are subject to suddenly "snapping down" towards one another after moving close enough to one another. These types of variable capacitors are also subject to microphonics and stiction problems.

Some MEMS variable capacitors are based upon electro-thermally actuated parallel-plate design. These types of variable capacitors are subject to reduced power handling capability due to gap reduction and the likelihood for breakdown occurrence. These variable capacitors also consume excessive power, especially if the electro-thermal actuation must be applied continuously to maintain the capacitance value.

Other MEMS variable capacitors utilize a massively-parallel, interdigited-comb device for actuation. These variable capacitors are so sensitive to parasitic substrate capacitance that they require either a high-resistivity substrate such as glass or the removal of the substrate beneath the MEMS device. Thus, this type of variable capacitor is not readily integrated into a conventional integrated circuit (IC) process. Additionally, the MEMS device is physically large because the capacitance dependence on the overlap of comb fingers requires large aspect ratios. These devices require excessive space and cause a low resonant frequency resulting to shock and vibration problems.

Therefore, it is desirable to provide MEMS variable capacitor apparatuses and related methods that improve upon aforementioned designs.

SUMMARY

According to one embodiment, a micro-electro-mechanical system (MEMS) variable capacitor and method can be provided including first and second electrodes being spaced apart, and at least one of the electrodes being movable when a voltage is applied across the first and second electrodes. The variable capacitor can also include a first and second conductive plate. The first conductive plate can be attached to and electrically isolated from the first electrode. The second conductive plate can be attached to the second electrode and spaced from the first conductive plate for movement of at least one of the plates with respect to the other plate upon application of voltage across the first and second electrodes to change the capacitance between the first and second plates.

According to a second embodiment, a micro-electro-mechanical system (MEMS) variable capacitor and method can be provided including first and second electrodes being spaced apart, and at least one of the electrodes being movable when a voltage is applied across the first and second electrodes. The variable capacitor can also include a torsional beam for providing resistance to the rotation of the first and second electrodes with respect to one another. Furthermore, the variable capacitor can include a first and second conductive plate. The first conductive plate can include a non-conductive section for attachment to and electrical isolation from the first electrode. The second conductive plate can be attached to the second electrode and spaced from the first conductive plate for movement of the second conductive plate with respect to the first conductive plate and a change in the capacitance between the first and second conductive plates when voltage is applied across the first and second electrodes.

According to a third embodiment, a variable capacitor apparatus and method can be provided including a plurality of micro-electro-mechanical system (MEMS) variable capacitors. The variable capacitors can include first and second electrodes being spaced apart, and at least one of the electrodes being movable when a voltage is applied across the first and second electrodes. The variable capacitors can also include a torsional beam for providing resistance to the rotational of the first and second electrodes with respect to one another. Furthermore, the variable capacitors can include a first and second conductive plate. The first conductive plate can be attached to and electrically isolated from the first electrode. The second conductive plate can be attached to the second electrode and spaced from the first conductive plate for movement of the second conductive plate with respect to the first conductive plate and a change in the capacitance between the first and second conductive plates when voltage is applied across the first and second electrodes. The variable capacitor apparatus can also include first and second conductive lines. The first conductive lines can be attached to the first and second electrodes of the variable capacitors for attachment to a voltage supply. The second conductive lines can be attached to the first and second conductive plates of the variable capacitors for attachment to an AC signal.

It is therefore an object to provide novel MEMS variable capacitor apparatuses and related methods.

BRIEF DESCRIPTION OF THE DRAWINGS

Exemplary embodiments will now be explained with reference to the accompanying drawings, of which:

FIG. 10 is a bottom view of the cell layout of a MEMS variable capacitor.

DETAILED DESCRIPTION

Figure 1:
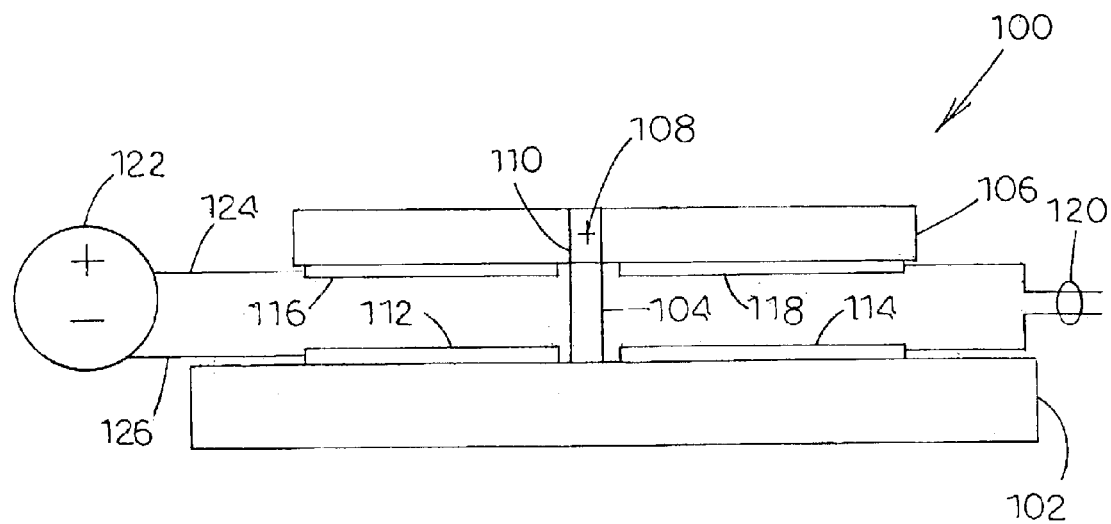
FIG. 1 is a side view of an exemplary MEMS variable capacitor.

It is understood that when a component such as a layer, substrate, contact, interconnect, electrode, conductive plate, or conductive line is referred to herein as being deposited or formed "on" another component, that component can be directly on the other component or, alternatively, intervening components (for example, one or more buffer or transition layers, interlayers, electrodes or contacts) can also be present. Furthermore, it is understood that the terms "disposed on", "attached to" and "formed on" are used interchangeably to describe how a given component is positioned or situated in relation to another component. Therefore, it will be understood that the terms "disposed on", "attached to" and "formed on" do not introduce any limitations relating to particular methods of material transport, deposition, or fabrication.

Contacts, interconnects, electrodes, conductive plates, conductive lines, and other various conductive elements of various metals can be formed by sputtering, CVD, or evaporation. If gold, nickel or Permalloy™ ($Ni_xFe_y$) is employed as the metal element, an electroplating process can be carried out to transport the material to a desired surface. The chemical solutions used in the electroplating of various metals are generally known. Some metals, such as gold, might require an appropriate intermediate adhesion layer to prevent peeling. Examples of adhesion material often used include chromium, titanium, or an alloy such as titanium-tungsten (TiW). Some metal combinations can require a diffusion barrier to prevent a chromium adhesion layer from diffusing through gold. Examples of diffusion barriers between gold and chromium would include platinum or nickel.

Conventional lithographic techniques can be employed in accordance with micromachining of the variable capacitors. Accordingly, basic lithographic process steps such as photoresist application, optical exposure, and the use of developers are not described in detail herein.

Similarly, generally known-etching processes can be employed to selectively remove material or regions of material. An imaged photoresist layer is ordinarily used as a masking template. A pattern can be etched directly into the bulk of a substrate, or into a thin film or layer that is then used as a mask for subsequent etching steps.

The type of etching process employed in a particular fabrication step (e.g., wet, dry, isotropic, anisotropic, anisotropic-orientation dependent), the etch rate, and the type of etchant used will depend on the composition of material to be removed, the composition of any masking or etch-stop layer to be used, and the profile of the etched region to be formed. As examples, poly-etch ($HF:HNO_3:CH_3COOH$) can generally be used for isotropic wet etching. Hydroxides of alkali metals (e.g., KOH), simple ammonium hydroxide ($NH_4OH$), quaternary (tetramethl) ammonium hydroxide (($CH_3)_4NOH$, also known commercially as TMAH), and ethylenediamine mixed with pyrochatechol in water (EDP) can be used for anisotropic wet etching to fabricate V-shaped or tapered grooves, trenches or cavities. Silicon nitride is typically used as the masking material against ethcing by KOH, and thus can be used in conjunction with the selective etching of silicon. Silicon dioxide is slowly etched by KOH, and thus can be used as a masking layer if the etch time is short. While KOH will etch undoped silicon, heavily doped (p++) silicon can be used as an etch-stop against KOH as well as the alkaline etchants and EDP. The preferred metal used to form contacts and interconnects is gold, which is resistant to EDP. The adhesion layer applied in connection with forming a gold component (e.g., chromium) is also resistant to EDP.

It will be appreciated that electrochemical etching in hydroxide solution can be performed instead of timed wet etching. For example, if a p-type silicon wafer is used as a substrate, an etch-stop can be created by epitaxially growing an n-type silicon end layer to form a p-n junction diode. A voltage is applied between the n-type layer and an electrode disposed in the solution to reverse-bias the p-n junction. As a result, the bulk p-type silicon is etched through a mask down to the p-n junction, stopping at the n-type layer. Furthermore, photovoltaic and galvanic etch-stop techniques are also suitable.

Dry etching techniques such as plasma-phase etching and reactive ion etching (RIE) can also be used to remove silicon and its oxides and nitrides, as well as various metals. Deep reactive ion etching (DRIE) can be used to anisotropically etch deep, vertical trenches in bulk layers. Silicon dioxide is typically used as an etch-stop against DRIE, and thus structures containing a buried silicon dioxide layer, such as silicon-on-insulator (SOI) wafers, can be used as starting substrates for the fabrication of microstructures.

An alternative patterning process to etching is the lift-off process. In this case, the conventional photolithography techniques are used for the negative image of the desired pattern. This process is typically used to pattern metals, which are deposited as a continuous film or films when adhesion layers and diffusion barriers are needed. The metal is deposited on the regions where it is to be patterned and on top of the photoresist mask (negative image). The photoresist and metal on top are removed to leave behind the desired pattern of metal.

As used herein, the term "device" is interpreted to have a meaning interchangeable with the term "component".

As used herein, the term "conductive" is generally taken to encompass both conducting and semi-conducting materials.

Examples of the methods of the present subject matter will now be described with reference to the accompanying drawings.

Referring to FIGS. 1–4, different views of an exemplary MEMS variable capacitor, generally designated 100, are illustrated. Referring specifically to FIG. 1, variable capacitor 100 can include a substrate 102 having a pair of spaced-apart pivot posts 104 formed thereon. Substrate 102 can comprise of one or more layers, composites, or other combinations of silicon, alumina, silica, polymers and other suitable substrate materials known to those of ordinary skill in the art. Pivot posts 104 support a non-conductive, structural component 106 for rotational movement of the opposing ends of component 106 about a pivot point 108. Pivot posts 104 can also include torsional beams 110 for providing resistance to the rotational movement of component 106.

Torsional beam 110 can provide vertical stiffness to limit vertical motion of component 106 with respect to substrate 102. Further, torsional beam 110 can provide torsional softness to ease rotational motion of component 106. In this embodiment, torsional beam 110 can have a rectangular cross-section and a beam of sufficient length to provide flexibility. Alternatively, torsional beam 110 can have any suitable cross-section shape, dimension, or length. Additionally, torsional beam 110 can include folded springs. Torsional beam 110 can comprise one or more layers of silica, alumina, un-doped semiconductors, polymers, and other non-conductive materials known to those of ordinary skill in the art. Alternatively, beam 110 can comprise of any suitable type of metal, semi-metal, doped semiconductor, or other suitable type of conductive material for electrically connecting electrode 116 and/or plate 118 to voltage source 122 or signal line 120, respectively.

Substrate 102 can also include a stationary electrode 112 and a stationary conductive plate 114 formed on a surface thereof. Component 106 can include a movable electrode 116 and a movable conductive plate 118 attached to the underside of component 106 and positioned above stationary electrode 112 and stationary conductive plate 114, respectively. Movable electrode 116 and movable conductive plate 118 can be attached to component 106 on opposite sides of pivot point 108 for moving in opposite directions with respect to substrate 102 on operative rotation of component 106. Conductive plates 114 and 118 can be electrically connected to a signal line 120 for supplying a signal, typically AC, to variable capacitor 100 from other electrical circuitry (not shown). Signal line 120 can comprise of a highly-conductive metal such as gold, aluminum, silver, copper, or the like. Signal line 120 can be connected to a high-frequency distribution network with minimum fixed capacitance. Typically, the electrical circuitry connected to signal line 120 is sensitive to capacitance of variable capacitor 100. Electrodes 112 and 116 and conductive plates 114 and 118 can comprise of any suitable type of metal, semi-metal, or doped semiconductor. The conductivity of the material can be sufficient to avoid substantial lateral voltage drops across electrodes 112 and 116 and/or conductive plates 114 and 118 during operation. Voltage drops are mostly a concern for plates 114 and 118 due to the high frequency signals typically applied to the plates causing high currents to flow. Plates 114 and 118 can comprise a highly conductive metal, such as copper, gold, silver, aluminum or the like.

Stationary electrode 112 and movable electrode 116 can be connected to a voltage supply 122 via conductive lines 124 and 126, respectively. Conductive lines 124 and 126 can comprise of any suitable conductive material, such as a metal, semi-metal, and doped semi-conductors. As shown, voltage supply 122 can produce a voltage across electrodes 112 and 116. An equal and opposite electrical charge develops on electrodes 112 and 116 on the application of a voltage. The equal and opposite electrical charge causes an electrostatic force to pull movable electrode 116, and the portion of component 106 to which electrode 116 is attached, towards stationary electrode 112. Torsional beams 110 produce a biasing force in an opposite direction from the electrostatic force to oppose movement of movable electrode towards stationary electrode 112. Movable electrode 116 deflects in a rotational direction about pivot point 108 towards stationary electrode 112 when the voltage applied across electrodes 112 and 116 is great enough to overcome the resistive force of torsional beams 110. As movable electrode 116 is deflected closer to stationary electrode 112, the resistive force of torsional beams 110 increases. The voltage applied across electrodes 112 and 116 can be increased to deflect movable electrode 116 closer to stationary electrode 112 than another position. Thus, the gap distance between electrode 112 and 116 can be adjusted by controlling the voltage output by voltage supply 122. The voltage applied by voltage supply 122 can be varied directly by an operator or other suitable electrical circuitry known to those of skill in the art for controlling the voltage output by a voltage supply.

Figure 2:
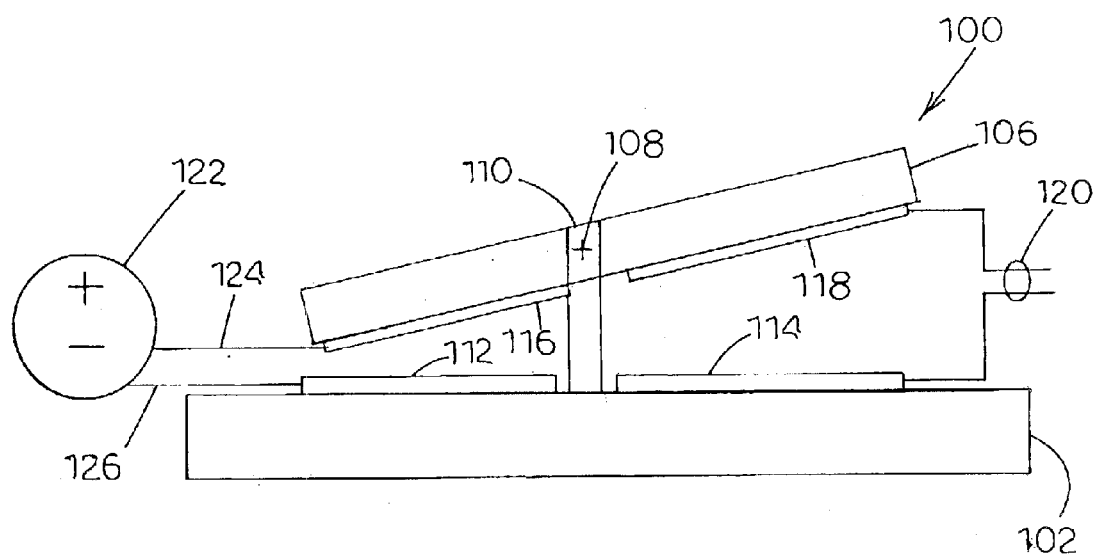
FIG. 2 is a side view of the variable capacitor of FIG. 1 in a position such that the movable electrode is deflected closer to the stationary electrode.

FIG. 2 illustrates variable capacitor 100 in a position such that movable electrode 116, and the portion of component 106 to which electrode 116 is attached, is deflected closer to stationary electrode 112 than shown in FIG. 1. This deflection can be caused by applying a voltage difference to electrodes 112 and 116 from voltage source 122 via conductive lines 124 and 126. The voltage difference can cause an electrostatic force which attracts electrodes 112 and 116 towards each other. Movable conductive plate 118, and the portion of component 106 to which plate 118 is attached, moves with respect to stationary conductive plate 114 when movable electrode 116 moves with respect to stationary electrode 112. As movable electrode 116 moves closer to stationary electrode 112, movable conductive plate 118 moves away from stationary conductive plate 114. Thus, a sufficient voltage applied to electrodes 112 and 116 can cause movable conductive plate 118 to move away from stationary conductive plate 114. The distance between conductive plates 114 and 118 can be adjusted by control of the voltage across electrodes 112 and 116. Thus, the capacitance of the capacitor formed by conductive plates 114 and 118 can be adjusted by application of voltage across electrodes 112 and 116.

Movable conductive plate 116 can deflect suddenly and fully against contact stationary conductive plate 112 when torsional beams 110 twist beyond a threshold angle. At this threshold, movable conductive plate 118 suddenly moves a maximum distance from stationary conductive plate 114 and the capacitance of variable capacitor 100 is suddenly reduced. This sudden movement typically occurs when movable electrode 116 has been deflected approximately ⅓ of the distance to stationary electrode 112, i.e., approximately ⅓ of the distance from a neutral position to a position against stationary electrode 112. Therefore, the voltage input to capacitance ratio is not a continuous relationship after reaching the threshold.

Structural component 106 can be formed of a non-conductive, dielectric material for electrically isolating movable electrode 116 and movable conductive plate 118. Furthermore, structural component 106 can comprise a rigid material for providing fixed attachment of movable electrode 116 to movable conductive plate 118. Alternatively, structural component 106 can comprise any other suitable non-conductive material known to those of skill in the art. Component 106 can comprise of one or more layers of silica, alumina, un-doped semiconductors, polymers, and other non-conductive materials known to those of ordinary skill in the art.

Figure 3:
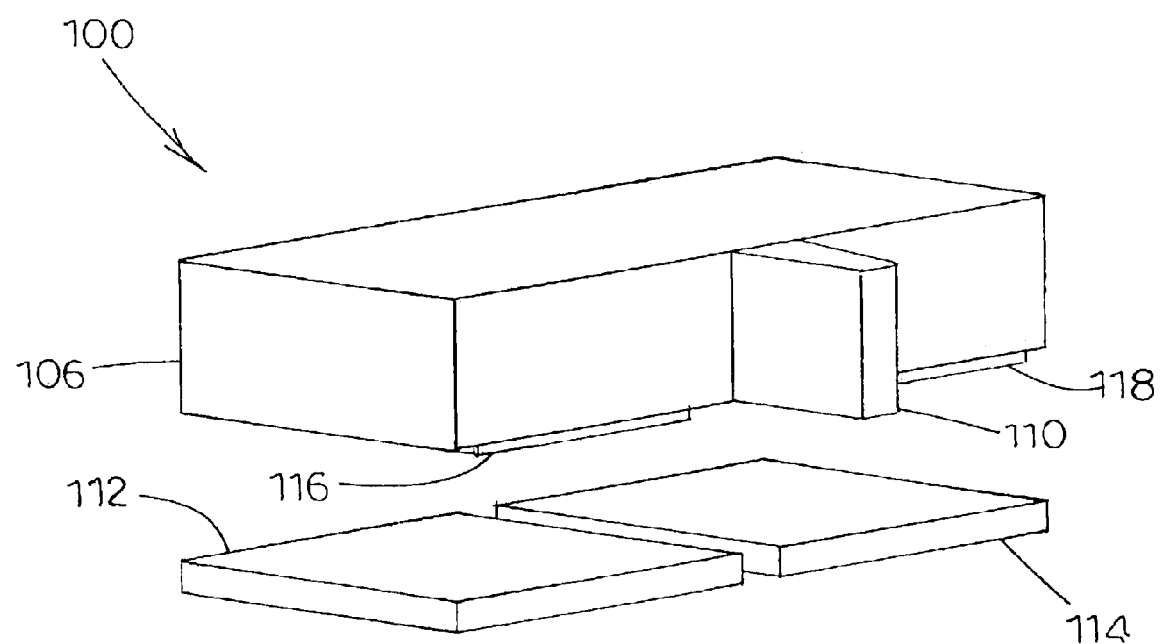
FIG. 3 is a perspective view of the variable capacitor of FIG. 1.
Figure 4:
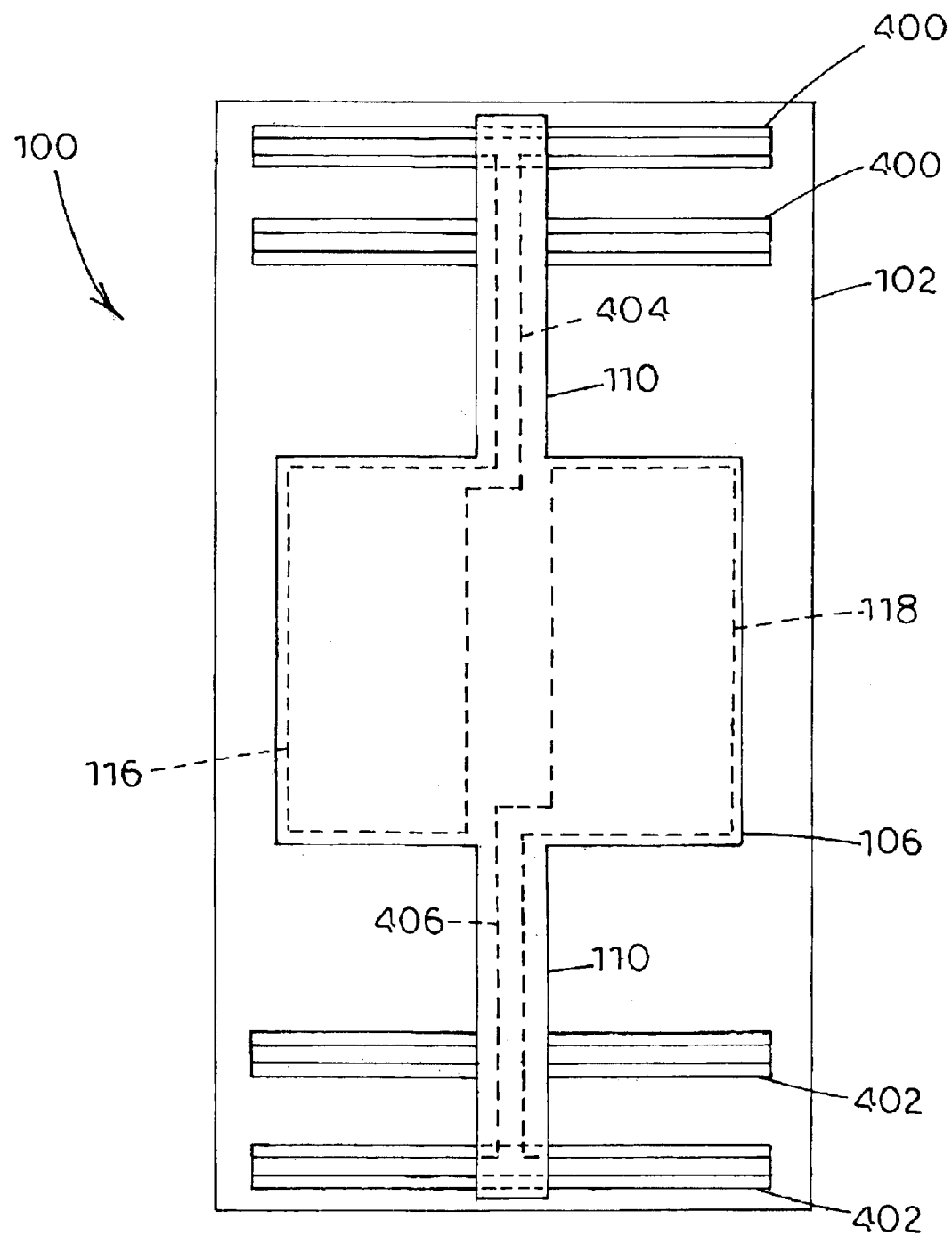
FIG. 4 is a top view of the variable capacitor of FIG. 1.

Referring to FIG. 3, a perspective view of variable capacitor 100 is illustrated. Substrate 102 is not shown. Torsional beam 110 is shown attached and extending from structural component 106. Referring now to FIG. 4, a top view of variable capacitor 100 is illustrated. Capacitor 100 can include pivot posts 400 and 402 for attaching torsional beams 110 to substrate 102. Movable electrode 116 and movable conductive plate 118 can be connected by conductive lines 404 and 406, respectively, across the underside of torsional beam 110 to pivot posts 400 and 402, respectively. Additionally, conductive lines 404 and 406 can extend along pivot posts 400 and 402, respectively, for connection to other voltage source 122 and signal line 120, respectively.

Figure 5:
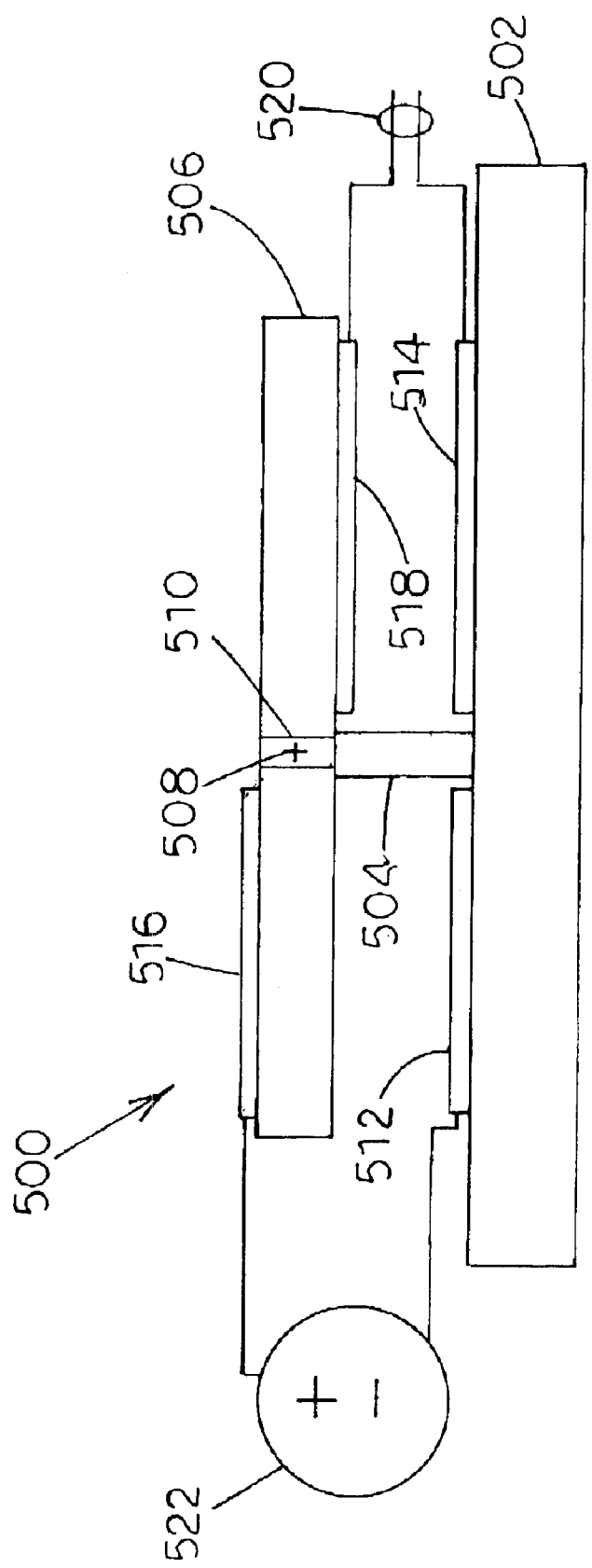
FIG. 5 is a side view of another exemplary MEMS variable capacitor.

Referring to FIG. 5, a side view of a MEMS variable capacitor, generally designated 500, is illustrated. Variable capacitor 500 can include a substrate 502 having a pair of pivot posts 504 attached on a surface thereof. Pivot posts 504 support a structural component 506 for rotational movement of the ends of component 506 about a pivot 508. Alternatively, structural component 506 can be suspended over substrate 502 by another known component and method known to those of skill in the art. Pivot posts 504 can also include torsional beams 510. Substrate 502 can also include a stationary electrode 512 and a stationary conductive plate 514 attached to a surface thereof. Component 506 can include a movable electrode 516 attached to the topside of component 506 and positioned above stationary electrode 512. Component 506 can also include a movable conductive plate 518 attached to the underside of component 506 and positioned above stationary conductive plate 514. Conductive plates 514 and 518 can be electrically connected to a signal line 520 for supplying a signal, typically AC, to variable capacitor 500 from other electrical circuitry (not shown). Stationary electrode 512 and movable electrode 516 can be connected to a voltage supply 522 for controlling the capacitance of conductive plates 514 and 518.

Movable electrode 516 can be attached to the topside of component 506 to prevent electrode 512 and 516 from contacting. Non-conductive component 506 contacts electrode 512 on full deflection of movable electrode 516. Thus, contact between electrodes 512 and 516 can be prevented. This functions to reduce stiction and prevent electrical shorting. A larger ratio with more linear control is obtained as structural component 506 tilts further before electrostatic pull-in occurs. If structural component 506 is thick enough, the control can be linear over the full range of motion. To achieve linearity as such, the electrical thickness of structural component 506 can be greater than twice the unactuated gap. Electrical thickness is the actual thickness of component 506 divided by the effective dielectric constant of component 506.

Figure 6:
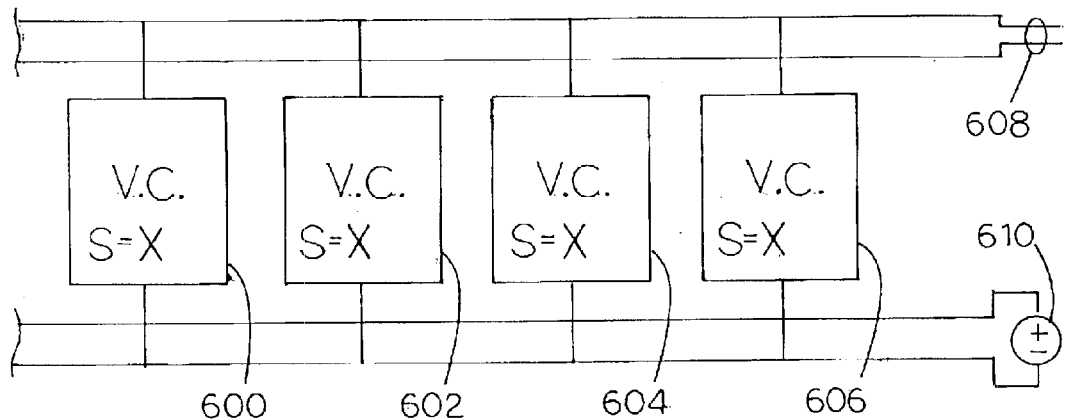
FIG. 6 is a block diagram of an array of identical MEMS variable capacitors.

An array of variable capacitors having different characteristics can be arranged in an array to provide a device having a desired capacitance response to voltage input. Referring to FIG. 6, a block diagram of an array of identical torsional, MEMS variable capacitors is illustrated. The array can include variable capacitors 600, 602, 604, and 606. In this example, there are four variable capacitors in the array. Alternatively, there can be any number of variable capacitors. Each capacitor can be connected across conductive plates, as described above, to signal line 608. Furthermore, each capacitor can be connected across electrodes, such as electrodes 112 and 116 shown in FIG. 1, to a voltage supply 610. The spring stiffness of variable capacitors 600, 602, 604, and 606 can each be equal to a constant X. Thus, as the applied voltage from voltage supply 610 reaches a threshold, the collective capacitance of variable capacitors 600, 602, 604, and 606 suddenly reduces. This sudden reduction in capacitance is due to the attractive force between the electrodes suddenly overcoming the resistive force of the torsional beams, such as torsional beams 110 shown in FIG. 1, at approximately the same time.

Figure 7:
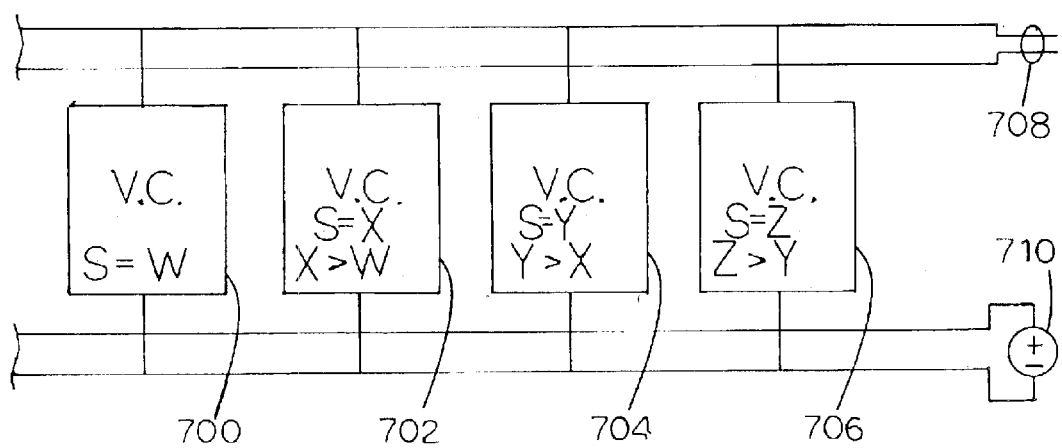
FIG. 7 is a block diagram of another array of different MEMS variable capacitors.

Referring to FIG. 7, a block diagram of an array of differing MEMS variable capacitors is illustrated. The array can include variable capacitors 700, 702, 704, and 706. In this example, there are four variable capacitors in the array. Alternatively, there can be any number of variable capacitors. Each capacitor can be connected across conductive plates, as described above, to signal line 708. Furthermore, each capacitor can be connected across electrodes, as described above, to a voltage supply 710. The torsional beams of variable capacitors 700, 702, 704, and 706 can have different "spring" stiffness. Variable capacitors 700, 702, 704, and 706 can have a spring constant W, X, Y, and Z, wherein X is greater than W, Y is greater than X, and Z is greater than Y. Therefore, as the applied voltage from voltage supply 710 reaches a threshold, the collective capacitance of variable capacitors 700, 702, 704, and 706 suddenly reduces at different applied voltages. Thus, as the applied voltage increases, capacitance of the array suddenly reduces in a cascading fashion according to when the resistive force of a torsional beam is overcome by the attractive force between the electrodes. Alternatively, other characteristics of the different variable capacitors (e.g., electrode size, conductive plate size, placement of the electrode and conductive plate on the surface or structural layer, and the size of the structural layer) in an array can be altered to change the capacitance versus applied voltage function. Furthermore, several of these characteristics known to those of skill in the art can be modified to optimize the capacitance versus applied voltage function. Variable capacitor 500 (shown in FIG. 5) can be used as one or more of variable capacitors 700, 702, 704, and 706 for achieving a capacitance versus voltage function for the array having a smoother and wider range of functional dependencies.

Figure 8:
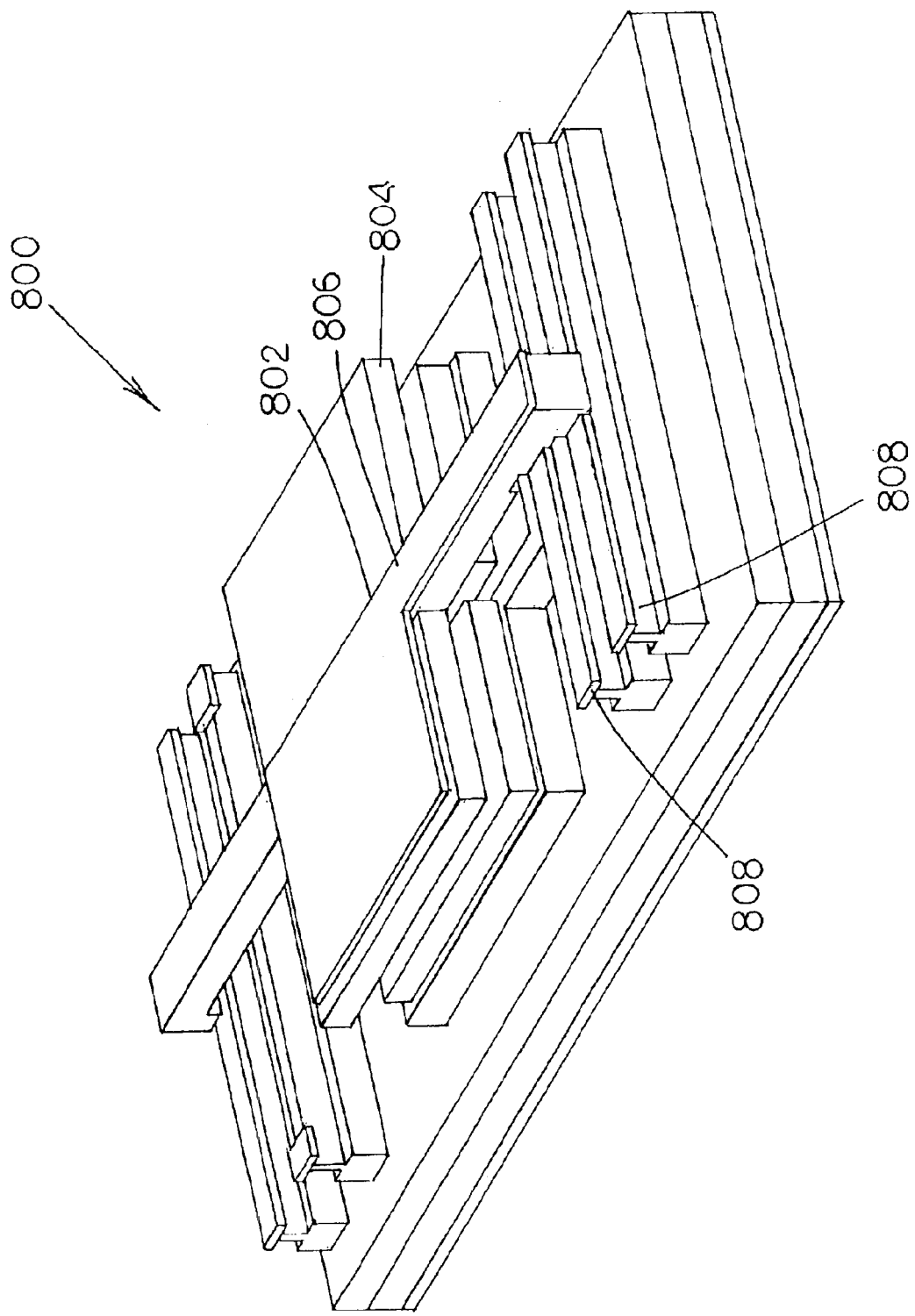
FIGS. 8 and 9 are perspective views of a MEMS variable capacitor.
Figure 9:
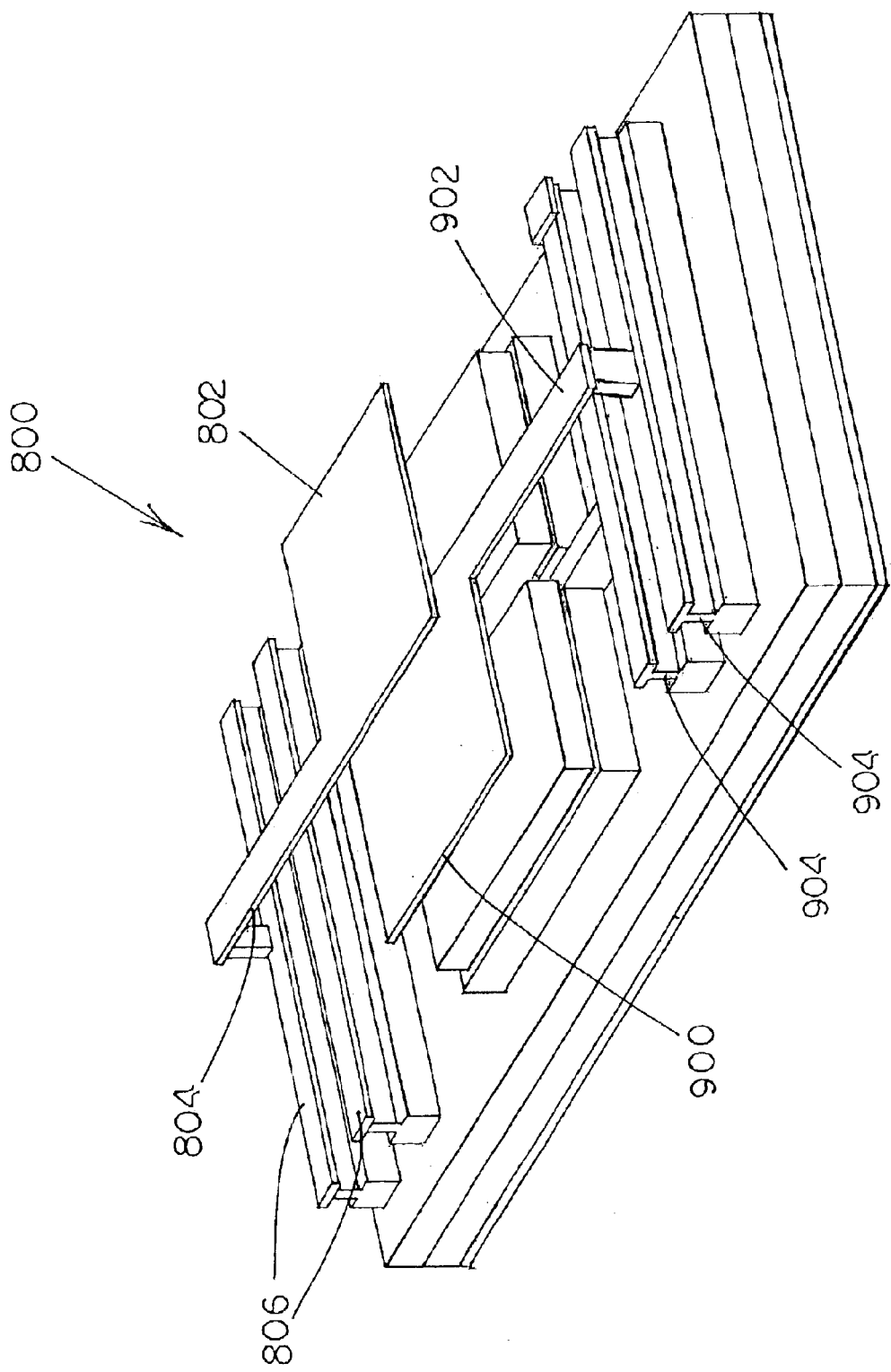

Referring to FIGS. 8 and 9, perspective views of a MEMS variable capacitor, generally designated 800, are illustrated. Referring specifically to FIG. 8, a movable conductive plate 802 can be located on the top side of a structural layer 804. Movable conductive plate 802 can include a conductor 806 that extends along the top of the torsional beam for connection to sensing terminals 808. Other electrical circuitry can connect to sensing terminals 808 for electrical communication with movable conductive plate 802.

Referring to FIG. 9, a perspective view of movable electrode 900 from a side opposite that of FIG. 8 is illustrated. The structural layer is not shown in order to show movable electrode 900 located on the bottom side of the structural layer. Movable electrode 900 includes a conductor 902 that extends along the bottom of the torsional beam for connection to sensing terminals 904. Other electrical circuitry can connect to sensing terminals 904 for electrical communication with movable electrode 900. The materials for fabricating variable capacitor 800 can be any of the materials previously described.

Referring to FIG. 10, a view of the bottom plate layer of a MEMS variable capacitor, generally designated 1000, is illustrated. Variable capacitor 1000 can include positive and negative conductors 1002 and 1004, respectively, for connection to voltage driving circuitry for stationary electrode 1006 and movable electrode (not shown). Stationary electrode can be in electrical communication with positive conductor 1002. Movable electrode (not shown) can be in electrical communication with negative conductor 1004. Variable capacitor 1000 can also include positive and negative conductors 1008 and 1010, respectively, for connection to sensing circuitry for stationary conductive plate 1012 and movable conductive plate (not shown). Stationary conductive plate 1012 can be in electrical communication with positive conductor 1008. Movable conductive plate (not shown) can be in electrical communication with negative conductor 1010.

It will be understood that various details of the above subject matter can be changed without departing from the scope of the present subject matter. Furthermore, the foregoing description is for the purpose of illustration only, and not for the purpose of limitation, as the subject matter is defined by the claims as set forth hereinafter.

What is claimed is:

1. A micro-electro-mechanical system (MEMS) variable capacitor, comprising:
   (a) first and second electrodes being spaced apart, and at least one of the electrodes being movable when a voltage is applied across the first and second electrodes;
   (b) a first conductive plate attached to and electrically isolated from the first electrode; and
   (c) a second conductive plate attached to the second electrode and spaced from the first conductive plate for movement of at least one of the plates with respect to the other plate upon application of a predetermined range of voltage across the first and second electrodes to provide a continuous range of capacitance between the first and second plates over the predetermined voltage range.

2. The variable capacitor of claim 1, further including a non-conductive section disposed between the first conductive plate and the first electrode for electrically isolating the first conductive plate and the first electrode.

3. The variable capacitor of claim 1, further including a torsional beam for providing resistance to movement of the first and second electrodes with respect to one another.

4. The variable capacitor of claim 3, wherein the torsional beam comprises a material selected from the group consisting of silica, alumina, un-doped semiconductors, polymers, metals, semi-metals, doped semi-conductors, and combinations thereof.

5. The variable capacitor of claim 1, wherein the second conductive plate and the second electrode are electrically isolated.

6. The variable capacitor of claim 1, further including an adjustable voltage supply connected to the first and second electrodes for controlling the capacitance between the first and second conductive plates.

7. The variable capacitor of claim 1, further including a signal line connected to the first and second conductive plates for electrically connecting an AC signal.

8. The variable capacitor of claim 1, further including a substrate attached to the second conductive plate and the second electrode.

9. The variable capacitor of claim 8, wherein the substrate comprises a material selected from the group consisting of silicon, alumina, silica, polymers, and combinations thereof.

10. The variable capacitor of claim 1, further including a structural component pivotal with respect to the second conductive plate and the second electrode, wherein the first conductive plate and the first electrode are connected to the structural component for pivot with respect to the second conductive plate and the second electrode.

11. The variable capacitor of claim 10, wherein the structural component comprises a material selected from the group consisting of silica, alumina, un-doped semiconductors, polymers, and combinations thereof.

12. The variable capacitor of claim 10, wherein the first conductive plate and the first electrode are attached to opposing sides of the structural component.

13. The variable capacitor of claim 10, further including a torsional beam connecting the structural component to the second conductive plate and the second electrode, wherein the torsional beam provides resistance to movement of the first and second electrodes with respect to one another.

14. The variable capacitor of claim 1, wherein the first and second electrodes comprise a material selected from the group consisting of metal, semi-metal, doped semiconductor, and combinations thereof.

15. The variable capacitor of claim 1, wherein the first and second conductive plates comprise a material selected from the group consisting of metal, semi-metal, doped semiconductor, and combinations thereof.

16. A micro-electro-mechanical system (MEMS) variable capacitor, comprising:
   (a) first and second electrodes being spaced apart, and at least one of the electrodes being movable when a voltage is applied across the first and second electrodes;
   (b) a torsional beam for providing resistance to the rotation of the first and second electrodes with respect to one another;
   (c) a first conductive plate having a non-conductive section for attachment to and electrical isolation from the first electrode; and
   (d) a second conductive plate attached to the second electrode and spaced from the first conductive plate for movement of the second conductive plate with respect to the first conductive plate upon application of a predetermined range of voltage across the first and second electrodes to provide a continuous range of capacitance between the first and second plates over the predetermined voltage range.

17. The variable capacitor of claim 16, further including a non-conductive section disposed between the first conductive plate and the first electrode for electrically isolating the first conductive plate and the first electrode.

18. The variable capacitor of claim 16, wherein the torsional beam comprises a material selected from the group consisting of silica, alumina, un-doped semiconductors, polymers, metals, semi-metals, doped semi-conductors, and combinations thereof.

19. The variable capacitor of claim 16, wherein the second conductive plate and the second electrode are electrically isolated.

20. The variable capacitor of claim 16, further including a substrate attached to the second conductive plate and the second electrode.

21. The variable capacitor of claim 16, further including a structural component pivotal with respect to the second conductive plate and the second electrode, wherein the first conductive plate and the first electrode are connected to the structural component for pivot with respect to the second conductive plate and the second electrode.

22. The variable capacitor of claim 21, wherein the structural component comprises a material selected from the group consisting of silica, alumina, un-doped semiconductors, polymers, and combinations thereof.

23. The variable capacitor of claim 21, wherein the first conductive plate and the first electrode are attached to opposing sides of the structural component.

24. The variable capacitor of claim 21, wherein the torsional beam is connected to the structural component.

25. A variable capacitor apparatus, comprising:
   (a) a plurality of micro-electro-mechanical system (MEMS) variable capacitors, the MEMS variable capacitors comprising:
      (i) first and second electrodes being spaced apart, and at least one of the electrodes being movable when a voltage is applied across the first and second electrodes;
      (ii) a torsional beam for providing resistance to the rotational of the first and second electrodes with respect to one another;
      (iii) a first conductive plate being attached to and electrically isolated from the first electrode; and
      (iv) a second conductive plate attached to the second electrode and spaced from the first conductive plate for movement of the second conductive plate with respect to the first conductive plate upon application of a predetermined range of voltage across the first and second electrodes to provided a continuous range of capacitance between the first and second plates over the predetermined voltage range;
   (b) first conductive lines attached to the first and second electrodes of the variable capacitors for attachment to a voltage supply; and
   (c) second conductive lines attached to the first and second conductive plates of the variable capacitors for attachment to an AC signal.

26. The variable capacitor apparatus of claim 25, wherein the torsional beam of each variable capacitor has a different torsional stiffness.

27. A method for varying the capacitance of two conductive plates, the method comprising:
   (a) providing a micro-electro-mechanical system (MEMS) variable capacitor comprising:
      (i) first and second electrodes being spaced apart, and at least one of the electrodes being movable when a voltage is applied across the first and second electrodes;
      (ii) a first conductive plate attached to and electrically isolated from the first electrode; and
      (iii) a second conductive plate attached to the second electrode and spaced from the first conductive plate for movement of at least one of the plates with respect to the other plate upon application of voltage across the first and second electrodes to change the capacitance between the first and second plates; and
   (b) applying a predetermined range of voltage across the first and second electrodes to change the capacitance between the first and second plates to a continuous capacitance between the first and second plates to a continuous capacitance over the predetermined voltage range.

28. The method of claim 27, further comprising the step of biasing at least one of the electrodes to provide resistance against the biased electrode with respect to movement toward the other electrode.

29. The method of claim 28, wherein the step of biasing at least one of the electrodes includes providing a torsional beam non-conductively connecting the first and second electrodes.

30. The method of claim 27, further including a structural component pivotal with respect to the second conductive plate and the second electrode, wherein the first conductive plate and the first electrode are connected to the structural component for pivot with respect to the second conductive plate and the second electrode.

31. The method of claim 30, wherein the first conductive plate and the first electrode are attached to opposing sides of the structural component.

32. The method of claim 31, wherein the variable capacitors further include a torsional beam connecting the structural component to the second conductive plate and the second electrode, wherein the torsional beam provides resistance to movement of the first and second electrodes with respect to one another.

* * * * *